US012754998B2

(12) United States Patent
You et al.

(10) Patent No.: US 12,754,998 B2
(45) Date of Patent: Oct. 6, 2026

(54) MANAGING RUNTIME OPERATION PRIVILEGES OF PRIVILEGED CONTAINERS IN REAL TIME

(71) Applicant: International Business Machines Corporation, Armonk, NY (US)

(72) Inventors: Yu Zui You, Ningbo (CN); Zhan Peng Huo, Beijing (CN); Xiao Ling Chen, Beijing (CN); Heng Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 18/949,118

(22) Filed: Nov. 15, 2024

(65) Prior Publication Data

US 2026/0141051 A1 May 21, 2026

(51) Int. Cl.
*G06F 21/52* (2013.01)
*G06F 11/34* (2006.01)

(52) U.S. Cl.
CPC .......... *G06F 21/52* (2013.01); *G06F 11/3476* (2013.01)

(58) Field of Classification Search
CPC ............................ G06F 21/52; G06F 11/3476
USPC .......................................................... 726/22
See application file for complete search history.

(56) References Cited

U.S. PATENT DOCUMENTS

| | | | | |
|---|---|---|---|---|
| 11,663,325 | B1 * | 5/2023 | Zahavi | G06F 21/577 726/22 |
| 11,954,217 | B2 | 4/2024 | Stoler et al. | |
| 12,001,867 | B2 | 6/2024 | Shen et al. | |
| 2005/0110639 | A1 * | 5/2005 | Puzio | G08B 13/2462 340/572.1 |
| 2017/0041296 | A1 * | 2/2017 | Ford | G06F 21/64 |
| 2020/0334371 | A1 | 10/2020 | Stoler et al. | |
| 2021/0263779 | A1 * | 8/2021 | Haghighat | G06F 11/3495 |
| 2022/0053047 | A1 | 2/2022 | Lenrow | |
| 2023/0025159 | A1 | 1/2023 | McQuaid | |
| 2024/0378305 | A1 * | 11/2024 | Acharya | G06F 21/6227 |

FOREIGN PATENT DOCUMENTS

| | | |
|---|---|---|
| WO | 2023/036672 A1 | 3/2023 |

OTHER PUBLICATIONS

Kurtzer, "Singularity: Scientific containers for mobility of compute", May 2017, PloS, pp. 1-20 (Year: 2017).*
Pagano, "Bias and Unfairness in Machine Learning Models: A Systematic Literature Review", 2022, arXiv, pp. 1-21 (Year: 2022).*

* cited by examiner

*Primary Examiner* — Taghi T Arani
*Assistant Examiner* — Gregory A Lane
(74) *Attorney, Agent, or Firm* — Yee & Associates, P.C.

(57) ABSTRACT

Managing container privileges is provided. It is determined whether a result of comparing a request for an operation privilege to perform a privileged operation by a privileged container against privilege approval rules is an approval of the request. In response to determining that the result of comparing the request for the operation privilege to perform the privileged operation by the privileged container against the privilege approval rules is the approval of the request, the operation privilege is granted to the privileged container to perform the privileged operation. The privileged operation is performed using the privileged container.

18 Claims, 5 Drawing Sheets

MANAGING RUNTIME OPERATION PRIVILEGES OF PRIVILEGED CONTAINERS IN REAL TIME

BACKGROUND

The disclosure relates generally to container-based environments and more specifically to managing container privileges in a container-based environment.

A container-based environment, architecture, platform, or the like, such as, for example, Kubernetes® (a registered trademark of the Linux Foundation of San Francisco, CA, USA), provides a structural design for automating deployment, scaling, and operations of containers across host nodes. A host node is a machine, either physical or virtual, where containers (i.e., application workloads) are deployed. A container is a version of a container image and is ready to run as an application, which corresponds to a service. In other words, the container image becomes the container at runtime. The container image is an executable package of software that includes everything needed to run the application (e.g., code, runtime, system tools, system libraries, settings, and the like).

SUMMARY

According to one illustrative embodiment, a method is provided. The method determines whether a result of comparing a request for an operation privilege to perform a privileged operation by a privileged container against privilege approval rules is an approval of the request. In response to determining that the result of comparing the request for the operation privilege to perform the privileged operation by the privileged container against the privilege approval rules is the approval of the request, the method grants the operation privilege to the privileged container to perform the privileged operation. The method performs the privileged operation using the privileged container. According to other illustrative embodiments, a computer system and computer program product are provided.

DETAILED DESCRIPTION

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A CPP embodiment is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
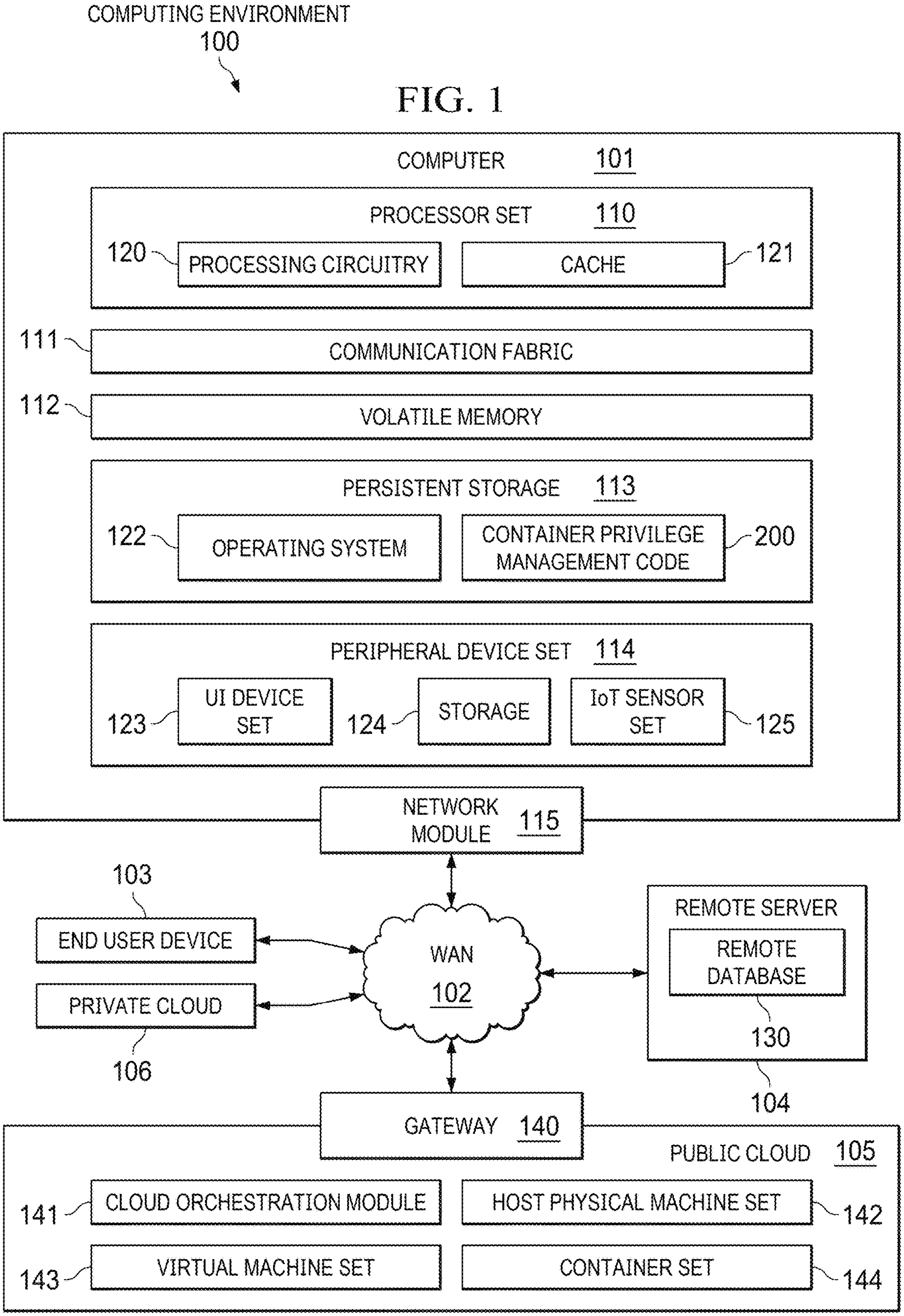
FIG. 1 is a pictorial representation of a computing environment in which illustrative embodiments may be implemented.
Figure 2:
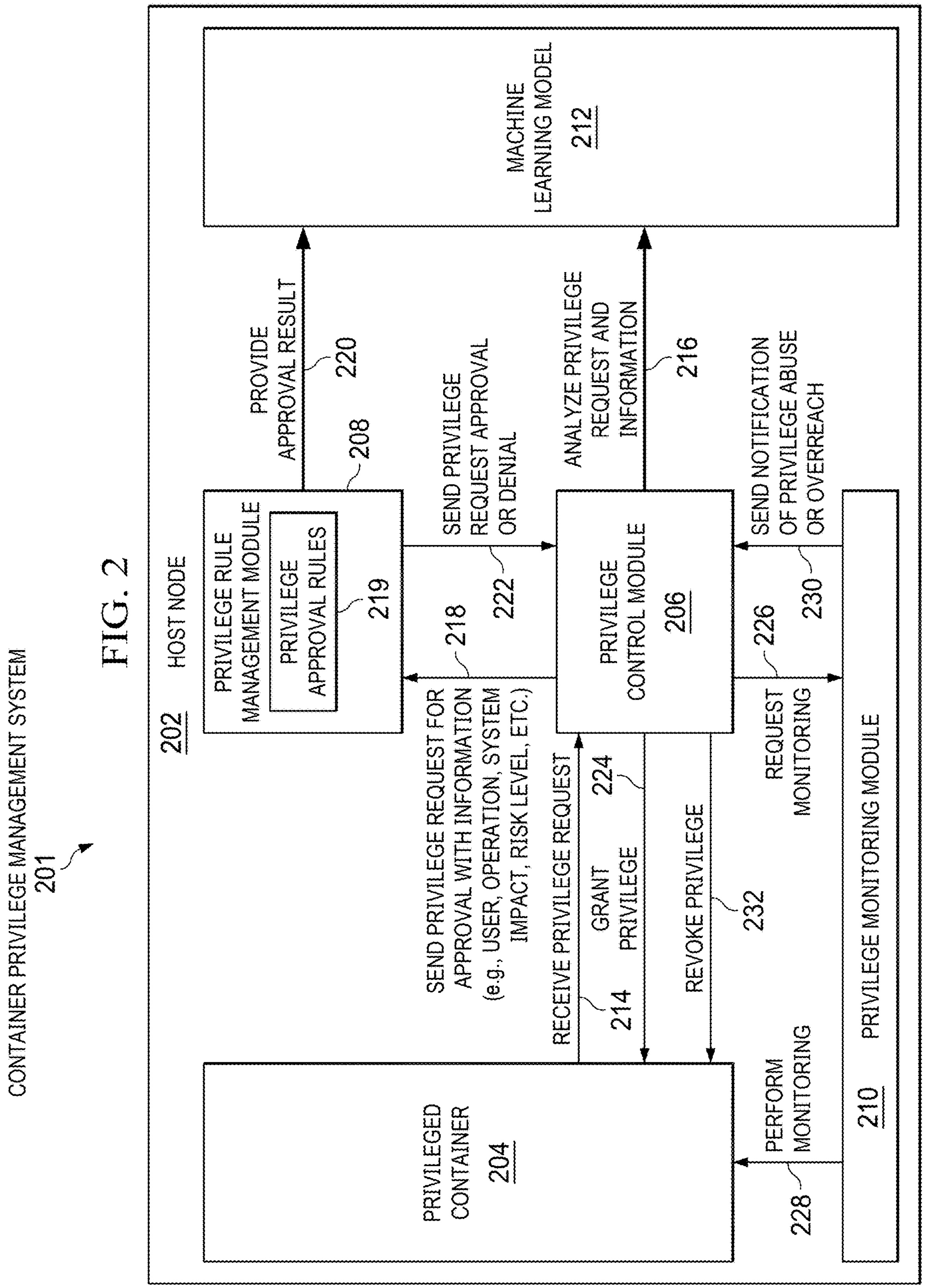
FIG. 2 is a diagram illustrating an example of a container privilege management system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container-based environment for the execution of at least some of the computer code involved in performing the inventive methods of illustrative embodiments, such as container privilege management code 200.

Container privilege management code 200 dynamically grants, revokes, and monitors runtime operation privileges of privileged containers to perform certain operations (e.g., privileged operations). For example, container privilege management code 200 utilizes a privilege control module to receive operation privilege requests from privileged containers via an interface where applications inside the privileged containers can request specific operation privileges (e.g., special permissions) needed to perform certain operations or actions. The privilege control module sends the operation privilege requests to a privilege rule management module of container privilege management code 200 for review and possible approval of the operation privilege requests based on a set of defined privilege approval rules.

The privilege control module grants and assigns the operation privileges to the requesting privileged container in response to the operation privilege request being approved by the privilege rule management module. Furthermore, in response to a privilege monitoring module of container privilege management code 200 detecting privilege misuse or overreach (e.g., a privileged container performs one or more operations or actions that go beyond what was approved by the privilege rule management module based on the defined privilege approval rules), the privilege control module immediately revokes the operation privileges granted to the privileged container.

The privilege rule management module ensures that operation privilege requests are evaluated and either automatically approved or rejected based on the defined privilege approval rules. Alternatively, the privilege rule management module can use a manual approval process for more complex operation privilege requests that do not meet the defined privilege approval rules and need human evaluation.

The privilege monitoring module continuously monitors how privileged containers use operation privileges via container log monitoring and container command execution monitoring to prevent privilege misuse or overreach by privileged containers. The container log monitoring watches a privileged container's activity logs for any sign of privilege abuse (e.g., unauthorized behavior). The container command execution monitoring ensures that any commands run by a privileged container matches the operation privileges approved by the privilege rule management module. If the privilege monitoring module detects privilege abuse or overreach, then the privilege monitoring module notifies the privilege control module to revoke the granted operation privileges of the privileged container.

In addition to container privilege management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container privilege management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in container privilege management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices.

Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the container privilege management services provided by computer 101), and may take any of the forms discussed above in connection with computer 101. EUD 103 typically receives helpful and useful data from the operations of computer 101. For example, in a hypothetical case where computer 101 is designed to provide a container privilege approval recommendation to the end user, this recommendation would typically be communicated from network module 115 of computer 101 through WAN 102 to EUD 103. In this way, EUD 103 can display, or otherwise present, the container privilege approval recommendation to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container privilege approval recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A privileged container is a container that has all the functions of a host node. In other words, a privilege container does not have any of the restrictions of a regular container. Thus, a privileged container can perform all operations that a host node can perform directly. In other words, a privilege container can run with the same privileges or permissions as the host node with root access.

When running a privileged container in a host node, an unauthorized or malicious user may gain access to the resources of the host node. As a result, by abusing the privileged container, the unauthorized user can gain access to the host node's resources. When an unauthorized user uses a privileged container to perform attacks, there is no need for remote code execution by the unauthorized user. However, more potential attack surfaces exist when executing code remotely by an unauthorized user. For example, after accessing a privileged container, an unauthorized user may run code with root privileges due to the enhanced permissions of the privileged container. This indicates that an unauthorized user can run the host node with root privileges, including capabilities of a system administrator.

After obtaining access to the exposed privileged container, the unauthorized user can perform malicious activities. For example, the unauthorized user can identify software running on the host node and exploit any related software vulnerabilities. The unauthorized user can also exploit container misconfigurations, such as, for example, weak credentials, unauthenticated containers, and the like. Due to the unauthorized user having root access, the unauthorized user can execute malicious code or mining machines, which the unauthorized user can effectively hide.

Some privileged containers need a relatively large number of permissions and need privileged users to run them. In order to facilitate management of these privileged containers, system administrators either manually grant privileged operation directly or manually deny privileged operation directly. Regardless, issues exist with manually granting or refusing privileged operations. For example, granting privileged operation continuously may lead to privilege loss due to certain security or human issues. In addition, completely prohibiting privileged operation to ensure security may prevent a business from performing its business operations, which may result in the loss of business or may require the business to expend more time and resources to perform its operations. A privileged operation is an operation or action that needs special permission to be granted to a container before the container can perform that particular operation or action on a host node.

Illustrative embodiments take into account and address the issues noted above. For example, to resolve such issues, illustrative embodiments provide a privilege management mechanism that dynamically grants operation privileges, and when the operations are completed, timely revokes those operation privileges. Such a privilege management mechanism can ensure the security of granted operation privileges and quickly respond to business operational needs in real time.

Thus, illustrative embodiments dynamically grant operation privileges to privileged containers to satisfy needed privileged container access to host node resources, while avoiding abuse of such granted operation privileges at the same time. In other words, illustrative embodiments dynamically grant privileges to privileged containers to only perform certain operations. Illustrative embodiments achieve this by utilizing a privilege control module, a privilege rule management module, and a privilege monitoring module to dynamically grant, monitor, and revoke runtime operation privileges of privileged containers. Illustrative embodiments revoke an operation privilege when, for example, a privileged container completes an operation corresponding to an operation privilege, a privileged container abuses a granted operation privilege, a privileged container overreaches a granted operation privilege, or the like.

Illustrative embodiments utilize the privilege rule management module to analyze operation privilege requests received from privileged containers and manage approval of these operation privilege requests to ensure reliability of the privilege approval rules. Illustrative embodiments utilize the privilege control module to automatically analyze the operation privileges needed by privileged containers to perform specific operations on host nodes, and perform the dynamic allocation and revocation of operation privileges based on a review by the privilege rule management module.

Illustrative embodiments utilize the privilege monitoring module to monitor the real time usage of operation privileges by a privileged container to detect any security issues, such as, for example, performance of unauthorized operations by the privileged container. In response to detecting a security issue, the privilege monitoring module notifies the privilege control module to revoke the operation privileges of the privileged container and trigger an audit or review of the operation privileges previously granted to the privileged container.

As a result, illustrative embodiments increase system security by controlling the dynamic granting and revoking of operation privileges (e.g., special permissions) to running privileged containers to prevent privilege misuse or privilege overreach (e.g., prevent a privileged container from performing an unauthorized operation that is beyond what was approved by the privilege approval rules). Thus, illustrative embodiments temporarily grant certain runtime operation privileges to privileged containers via dynamic approval so that the privileged containers can execute certain controllable privileged operations for a time until the privileged operations are completed.

Accordingly, illustrative embodiments provide one or more technical solutions that overcome a technical problem with granting container privileges without increasing system security risk. As a result, these one or more technical solutions provide a technical effect and practical application in the field of container-based environments.

With reference now to FIG. 2, a diagram illustrating an example of a container privilege management system is depicted in accordance with an illustrative embodiment. Container privilege management system 201 is implemented in host node 202, such as, for example, computer 101 in FIG. 1. Container privilege management system 201 is a system of hardware and software components for dynamically granting and revoking runtime operation privileges of privileged containers to perform certain operations, such as privileged operations, on host node 202.

In this example, host node 202 includes privileged container 204, privilege control module 206, privilege rule management module 208, privilege monitoring module 210, and machine learning model 212. Privileged container 204, privilege control module 206, privilege rule management module 208, privilege monitoring module 210, and machine learning model 212 may be implemented by container privilege management code 200 in FIG. 1. However, it should be noted that even though privilege control module 206, privilege rule management module 208, privilege monitoring module 210, and machine learning model 212 are shown as residing in host node 202 in this example, in an alternative illustrative embodiment privilege control module 206, privilege rule management module 208, privilege monitoring module 210, and machine learning model 212 may be located on a different host node in the container-based environment to manage container privileges on host node 202.

At 214, host node 202 utilizes privilege control module 206 to receive an operation privilege request from privileged container 204 to perform a privileged operation. It should be noted that privileged container 204 may be one of a plurality of different containers running on host node 202. At 216, privilege control module 206 sends the operation privilege request and any associated information (e.g., user, operation, system impact, risk level, and the like) to machine learning model 212 for analysis and further learning.

In addition, at 218, privilege control module 206 sends the operation privilege request and the associated information to privilege rule management module 208 for approval. Privilege rule management module 208 compares the operation privilege request and the associated information against privilege approval rules 219 to determine an approval result. Privilege approval rules 219 represent a set of predefined rules for automatically approving or denying operation privilege requests submitted by privileged containers, such as privileged container 204. For example, if a particular operation privilege request meets or satisfies one or more of privilege approval rules 219, then privilege rule management module 208 approves that particular operation privilege request. Conversely, if a particular operation privilege request fails to meet or satisfy one or more of privilege approval rules 219, then privilege rule management module 208 denies that particular operation privilege request. It should be noted that if privilege rule management module 208 denies a particular operation privilege request, privilege rule management module 208 may send the denial to a user (e.g., system administrator) for manual review and possible approval.

At 220, privilege rule management module 208 sends the approval result to machine learning model 212 for analysis and further learning. Moreover, at 222, privilege rule management module 208 sends approval or denial (i.e., the approval result) of the operation privilege request to privilege control module 206. In this example, the approval result is approval of the operation privilege request.

As a result, at 224, privilege control module 206 grants the operation privilege to privileged container 204 to perform the privileged operation on host node 202. Furthermore, privilege control module 206 requests that privilege monitoring module 210 monitor privileged container 204 while performing the privileged operation. At 228, in response to receiving the monitoring request, privilege monitoring module 210 performs the monitoring of privileged container 204 using log monitoring and command execution monitoring.

At 230, in response to at least one of the log monitoring and command execution monitoring detecting privilege abuse or overreach (e.g., privilege container 204 is performing one or more operations beyond the scope of the operation privilege initially granted to privilege container 204), privilege monitoring module 210 sends a notification to privilege control module 206 indicating the privilege abuse or overreach by privileged container 204. At 232, in response to receiving the notification from privilege monitoring module 210 indicating the privilege abuse or overreach by privileged container 204, privilege control module 206 immediately revokes the operation privilege previously granted to privileged container 204.

Figure 3:
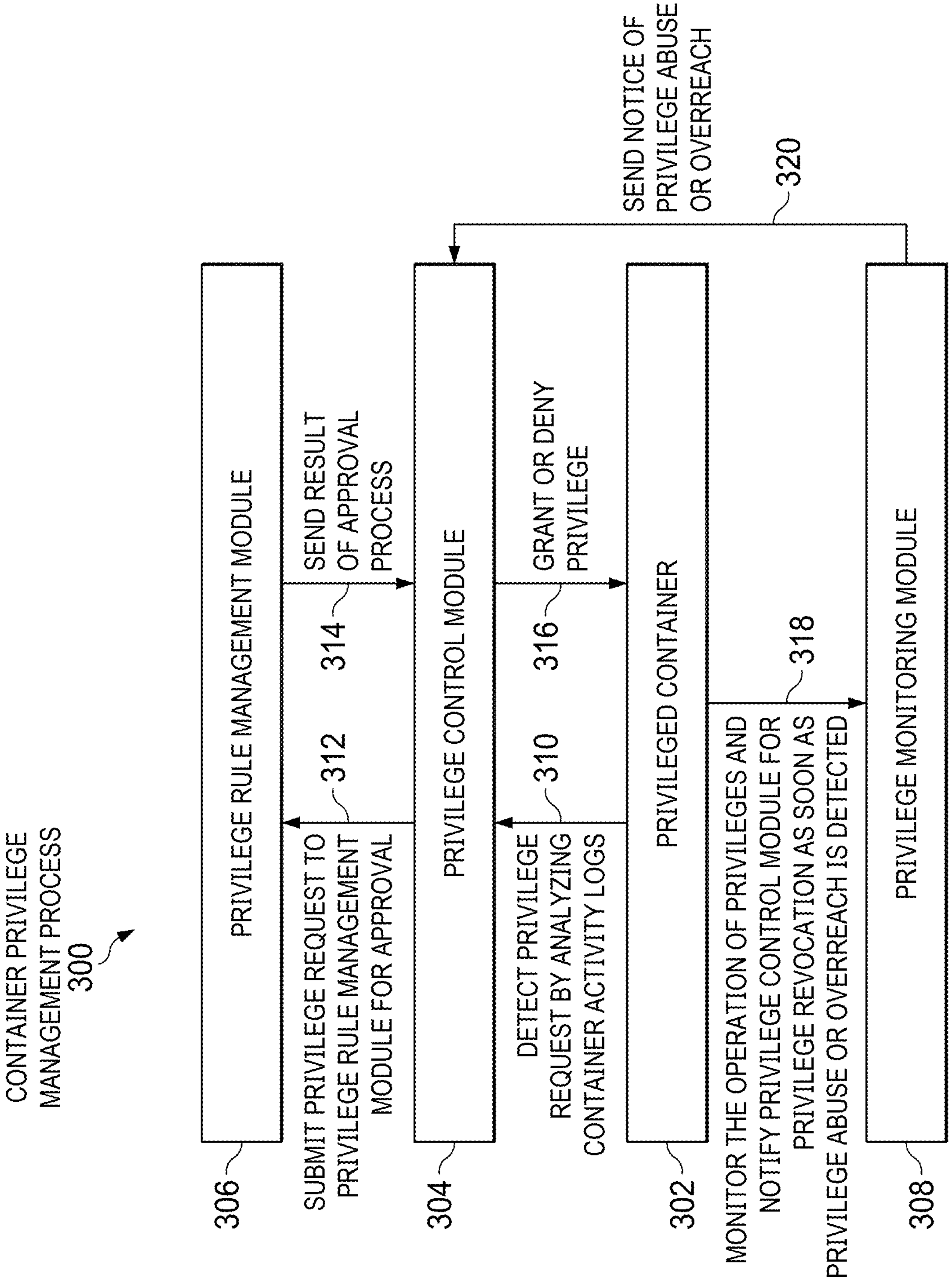
FIG. 3 is a diagram illustrating an example of a container privilege management process in accordance with an illustrative embodiment.

With reference now to FIG. 3, a diagram illustrating an example of a container privilege management process is depicted in accordance with an illustrative embodiment. Container privilege management process 300 may be implemented in a host node, such as, for example, computer 101 in FIG. 1 or host node 202 in FIG. 2.

In this example, container privilege management process 300 includes privileged container 302, privilege control module 304, privilege rule management module 306, and privilege monitoring module 308. Privileged container 302, privilege control module 304, privilege rule management module 306, and privilege monitoring module 308 may be, for example, privileged container 204, privilege control module 206, privilege rule management module 208, and privilege monitoring module 210 in FIG. 2.

At 310, privilege control module 304 detects an operation privilege request to perform a privileged operation by analyzing container activity logs corresponding to privileged container 302. At 312, privilege control module 304 submits the operation privilege request to privilege rule management module 306 for approval.

At 314, privilege rule management module 306 sends a result of the approval process to privilege control module 304. At 316, privilege control module 304 either grants or denies the operation privilege request made by privileged container 302 based on the result of the approval process received from privilege rule management module 306.

In this example, privilege control module 304 grants the operation privilege request allowing privileged container 302 to perform the privileged operation. At 318, privilege monitoring module 308 monitors the operation of privileges and notifies privilege control module 304 for privilege revocation as soon as privilege abuse or overreach is detected. At 320, privilege monitoring module 308 detects privilege abuse or overreach by privileged container 302 and sends a notice of privilege abuse or overreach to privilege control module 304 for revocation of the operation privilege previously granted to privileged container 302.

Figure 4A:
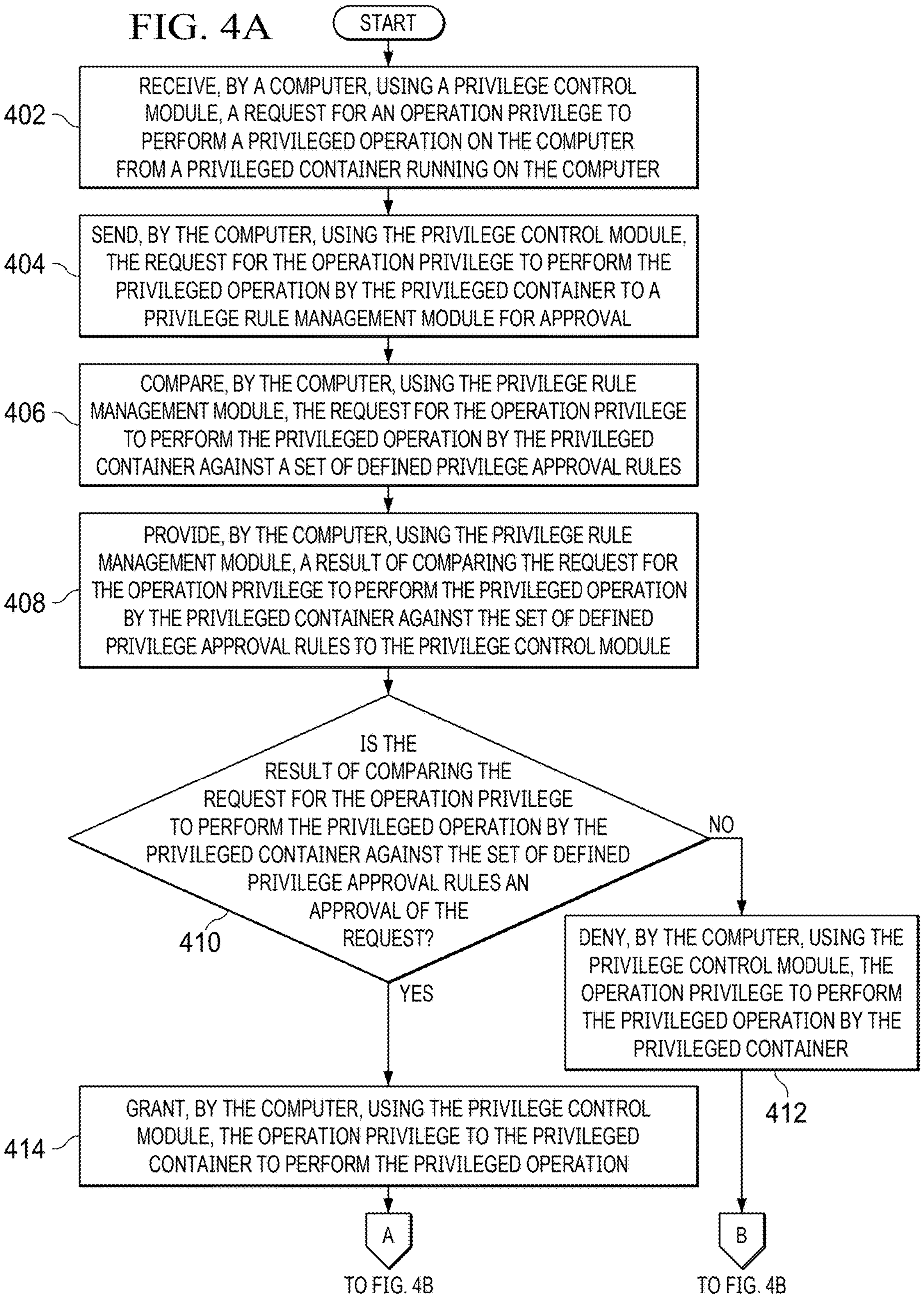
FIGS. 4A-4B are a flowchart illustrating a process for dynamically managing container privileges in accordance with an illustrative embodiment.
Figure 4B:
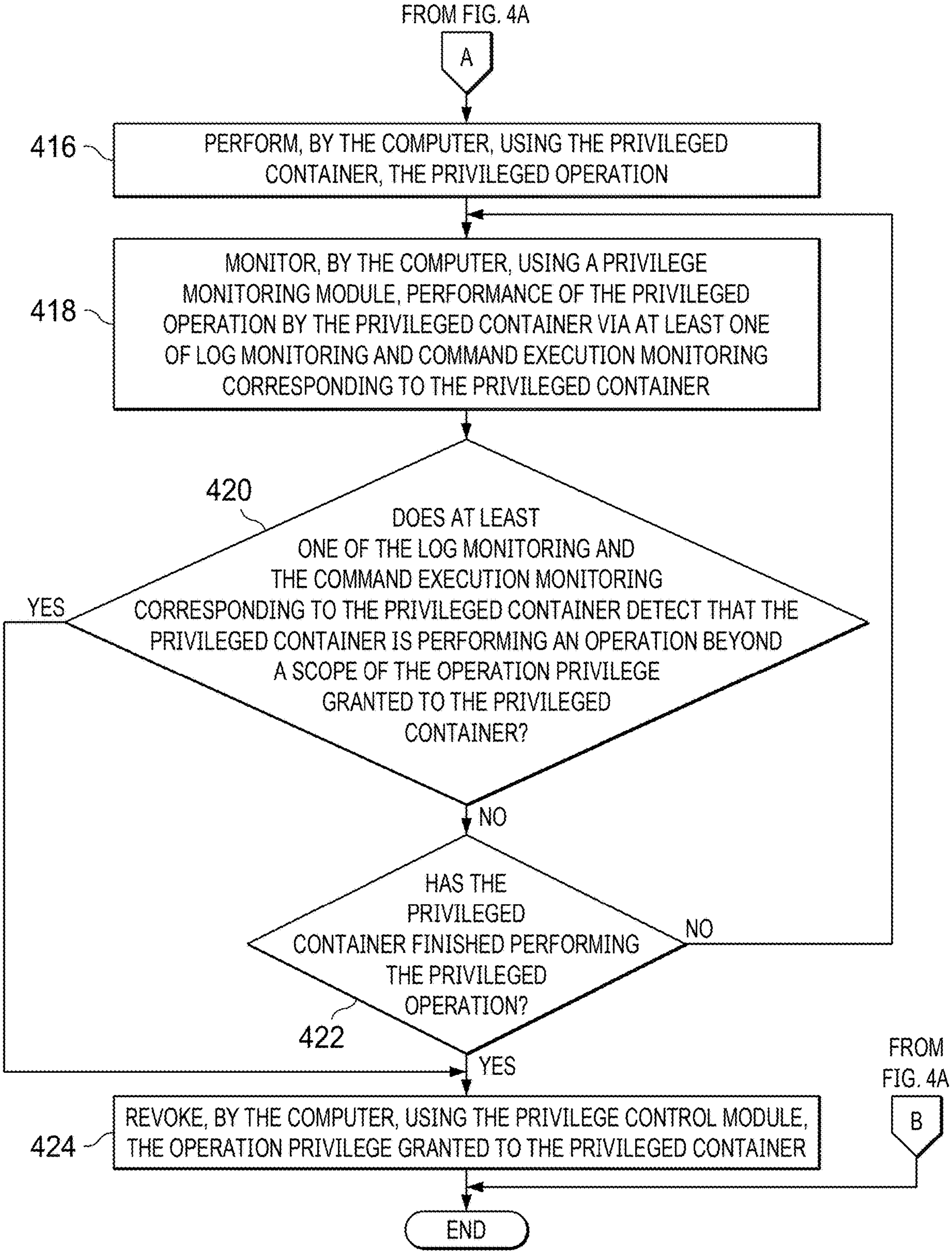

With reference now to FIGS. 4A-4B, a flowchart illustrating a process for dynamically managing container privileges is shown in accordance with an illustrative embodiment. The process shown in FIGS. 4A-4B may be implemented in a computer, such as, for example, computer 101 in FIG. 1 or host node 202 in FIG. 2. For example, the process shown in FIGS. 4A-4B may be implemented by container privilege management code 200 in FIG. 1.

The process begins when the computer, using a privilege control module, receives a request for an operation privilege to perform a privileged operation on the computer from a privileged container running on the computer (step 402). Afterward, the computer, using the privilege control module, sends the request for the operation privilege to perform the privileged operation by the privileged container to a privilege rule management module for approval (step 404).

The computer, using the privilege rule management module, compares the request for the operation privilege to perform the privileged operation by the privileged container against a set of defined privilege approval rules (step 406). The computer, using the privilege rule management module, provides a result of comparing the request for the operation privilege to perform the privileged operation by the privileged container against the set of defined privilege approval rules to the privilege control module (step 408).

The computer, using the privilege control module, makes a determination as to whether the result of comparing the request for the operation privilege to perform the privileged operation by the privileged container against the set of defined privilege approval rules is an approval of the request (step 410). If the computer, using the privilege control module, determines that the result of comparing the request for the operation privilege to perform the privileged operation by the privileged container against the set of defined privilege approval rules is not an approval of the request, no output of step 410, then the computer, using the privilege control module, denies the operation privilege to perform the privileged operation by the privileged container (step 412). Thereafter, the process terminates. If the computer, using the privilege control module, determines that the result of comparing the request for the operation privilege to perform the privileged operation by the privileged container against the set of defined privilege approval rules is an approval of the request, yes output of step 410, then the computer, using the privilege control module, grants the operation privilege to the privileged container to perform the privileged operation (step 414).

In response to the privilege control module granting the operation privilege, the computer, using the privileged container, performs the privileged operation (step 416). The computer, using a privilege monitoring module, monitors performance of the privileged operation by the privileged container via at least one of log monitoring and command execution monitoring corresponding to the privileged container (step 418).

The computer, using the privilege monitoring module, makes a determination as to whether at least one of the log monitoring and the command execution monitoring corresponding to the privileged container detects that the privileged container is performing an operation beyond a scope of the operation privilege granted to the privileged container (step 420). If the computer, using the privilege monitoring module, determines that at least one of the log monitoring and the command execution monitoring corresponding to the privileged container does detect that the privileged container is performing an operation beyond the scope of the operation privilege granted to the privileged container, yes output of step 420, then the process proceeds to step 424.

If the computer, using the privilege monitoring module, determines that at least one of the log monitoring and the command execution monitoring corresponding to the privileged container does not detect that the privileged container is performing an operation beyond the scope of the operation privilege granted to the privileged container, no output of step 420, then the computer, using the privilege monitoring module, makes a determination as to whether the privileged container finished performing the privileged operation (step 422). If the computer, using the privilege monitoring module, determines that the privileged container has not finished performing the privileged operation, no output of step 422, then the process returns to step 418 where the computer, using the privilege monitoring module, continues to monitor the performance of the privileged operation by the privileged container.

If the computer, using the privilege monitoring module, determines that the privileged container has finished performing the privileged operation, yes output of step 422, then the computer, using the privilege control module, revokes the operation privilege granted to the privileged container (step 424). Thereafter, the process terminates.

Thus, illustrative embodiments of the present disclosure provide a computer-implemented method, computer system, and computer program product for dynamically managing container privileges in real time. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically managing container privileges in real time, the method comprising:

detecting a request for an operation privilege to perform a privileged operation by a privileged container based on analyzing container activity logs corresponding to the privileged container running on a computer;

sending the request for the operation privilege to perform the privileged operation by the privileged container and associated information that includes user, operation, system impact, and risk level to a machine learning model for analysis and learning;

sending the request for the operation privilege to perform the privileged operation by the privileged container and the associated information that includes the user, the operation, the system impact, and the risk level to a privilege rule management module for approval;

comparing the request for the operation privilege to perform the privileged operation by the privileged container against privilege approval rules using the privilege rule management module;

determining whether a result of comparing the request for the operation privilege to perform the privileged operation by the privileged container against the privilege approval rules is an approval of the request;

responsive to determining that the result of comparing the request for the operation privilege to perform the privileged operation by the privileged container against the privilege approval rules is the approval of the request, granting the operation privilege to the privileged container to perform the privileged operation; and performing the privileged operation using the privileged container.

2. The method of claim 1, further comprising:

responsive to determining that the result of comparing the request for the operation privilege to perform the privileged operation by the privileged container against the privilege approval rules is not the approval of the request, denying the operation privilege to perform the privileged operation by the privileged container.

3. The method of claim 1, further comprising:

monitoring performance of the privileged operation by the privileged container via container log monitoring and container command execution monitoring corresponding to the privileged container.

4. The method of claim 3, further comprising:

determining whether the container log monitoring and the container command execution monitoring corresponding to the privileged container detects that the privileged container is performing an operation beyond a scope of the operation privilege granted to the privileged container; and responsive to determining that the container log monitoring and the container command execution monitoring corresponding to the privileged container does detect that the privileged container is performing the operation beyond the scope of the operation privilege granted to the privileged container, revoking the operation privilege granted to the privileged container.

5. The method of claim 4, further comprising:

responsive to determining that the container log monitoring and the container command execution monitoring corresponding to the privileged container does not detect that the privileged container is performing an operation beyond the scope of the operation privilege granted to the privileged container, determining whether the privileged container finished performing the privileged operation; and responsive to determining that the privileged container has finished performing the privileged operation, revoking the operation privilege granted to the privileged container.

6. The method of claim 1, further comprising:

providing the result of comparing the request for the operation privilege to perform the privileged operation by the privileged container against the privilege approval rules to a privilege control module; and sending the result of comparing the request for the operation privilege to perform the privileged operation by the privileged container to the machine learning model for analysis and learning.

7. A computer system for dynamically managing container privileges in real time, the computer system comprising:

a processor set;

one or more computer-readable storage media; and program instructions stored on the one or more computer-readable storage media to cause the processor set to perform operations comprising:

detecting a request for an operation privilege to perform a privileged operation by a privileged container based on analyzing container activity logs corresponding to the privileged container running on the computer system;

sending the request for the operation privilege to perform the privileged operation by the privileged container and associated information that includes user, operation, system impact, and risk level to a machine learning model for analysis and learning;

sending the request for the operation privilege to perform the privileged operation by the privileged container and the associated information that includes the user, the operation, the system impact, and the risk level to a privilege rule management module for approval;

comparing the request for the operation privilege to perform the privileged operation by the privileged container against privilege approval rules using the privilege rule management module;

determining whether a result of comparing the request for the operation privilege to perform the privileged operation by the privileged container against the privilege approval rules is an approval of the request;

responsive to determining that the result of comparing the request for the operation privilege to perform the privileged operation by the privileged container against the privilege approval rules is the approval of the request, granting the operation privilege to the privileged container to perform the privileged operation; and performing the privileged operation using the privileged container.

8. The computer system of claim 7, wherein the operations further comprise:

responsive to determining that the result of comparing the request for the operation privilege to perform the privileged operation by the privileged container against the privilege approval rules is not the approval of the request, denying the operation privilege to perform the privileged operation by the privileged container.

9. The computer system of claim 7, wherein the operations further comprise:

monitoring performance of the privileged operation by the privileged container via container log monitoring and container command execution monitoring corresponding to the privileged container.

10. The computer system of claim 9, wherein the operations further comprise:

determining whether the container log monitoring and the container command execution monitoring corresponding to the privileged container detects that the privileged container is performing an operation beyond a scope of the operation privilege granted to the privileged container; and responsive to determining that the container log monitoring and the container command execution monitoring corresponding to the privileged container does detect that the privileged container is performing the operation beyond the scope of the operation privilege granted to the privileged container, revoking the operation privilege granted to the privileged container.

11. The computer system of claim 10, wherein the operations further comprise:

responsive to determining that the container log monitoring and the container command execution monitoring corresponding to the privileged container does not detect that the privileged container is performing an operation beyond the scope of the operation privilege granted to the privileged container, determining whether the privileged container finished performing the privileged operation; and responsive to determining that the privileged container has finished performing the privileged operation, revoking the operation privilege granted to the privileged container.

12. The computer system of claim 7, wherein the operations further comprise:

providing the result of comparing the request for the operation privilege to perform the privileged operation by the privileged container against the privilege approval rules to a privilege control module; and sending the result of comparing the request for the operation privilege to perform the privileged operation by the privileged container to the machine learning model for analysis and learning.

13. A computer program product for dynamically managing container privileges in real time, the computer program product comprising:

one or more computer-readable storage media; and program instructions stored on the one or more computer-readable storage media to perform operations comprising:

detecting a request for an operation privilege to perform a privileged operation by a privileged container based on analyzing container activity logs corresponding to the privileged container running on a computer;

sending the request for the operation privilege to perform the privileged operation by the privileged container and associated information that includes user, operation, system impact, and risk level to a machine learning model for analysis and learning;

sending the request for the operation privilege to perform the privileged operation by the privileged container and the associated information that includes the user, the operation, the system impact, and the risk level to a privilege rule management module for approval;

comparing the request for the operation privilege to perform the privileged operation by the privileged container against privilege approval rules using the privilege rule management module;

determining whether a result of comparing the request for the operation privilege to perform the privileged operation by the privileged container against the privilege approval rules is an approval of the request;

responsive to determining that the result of comparing the request for the operation privilege to perform the privileged operation by the privileged container against the privilege approval rules is the approval of the request, granting the operation privilege to the privileged container to perform the privileged operation; and performing the privileged operation using the privileged container.

14. The computer program product of claim 13, wherein the operations further comprise:

responsive to determining that the result of comparing the request for the operation privilege to perform the privileged operation by the privileged container against the privilege approval rules is not the approval of the request, denying the operation privilege to perform the privileged operation by the privileged container.

15. The computer program product of claim 13, wherein the operations further comprise:

monitoring performance of the privileged operation by the privileged container via container log monitoring and container command execution monitoring corresponding to the privileged container.

16. The computer program product of claim 15, wherein the operations further comprise:

determining whether the container log monitoring and the container command execution monitoring corresponding to the privileged container detects that the privileged container is performing an operation beyond a scope of the operation privilege granted to the privileged container; and responsive to determining that the container log monitoring and the container command execution monitoring corresponding to the privileged container does detect that the privileged container is performing the operation beyond the scope of the operation privilege granted to the privileged container, revoking the operation privilege granted to the privileged container.

17. The computer program product of claim 16, wherein the operations further comprise:

responsive to determining that the container log monitoring and the container command execution monitoring corresponding to the privileged container does not detect that the privileged container is performing an operation beyond the scope of the operation privilege granted to the privileged container, determining whether the privileged container finished performing the privileged operation; and responsive to determining that the privileged container has finished performing the privileged operation, revoking the operation privilege granted to the privileged container.

18. The computer program product of claim 13, wherein the operations further comprise:

providing the result of comparing the request for the operation privilege to perform the privileged operation by the privileged container against the privilege approval rules to a privilege control module; and sending the result of comparing the request for the operation privilege to perform the privileged operation by the privileged container to the machine learning model for analysis and learning.

* * * * *